US008139329B2

(12) United States Patent
Martin

(10) Patent No.: US 8,139,329 B2
(45) Date of Patent: Mar. 20, 2012

(54) OVER-VOLTAGE PROTECTION CIRCUIT

(75) Inventor: Steven Martin, Chelmsford, MA (US)

(73) Assignee: Linear Technology Corporation, Milpitas, CA (US)

( * ) Notice: Subject to any disclaimer, the term of this patent is extended or adjusted under 35 U.S.C. 154(b) by 449 days.

(21) Appl. No.: 12/181,862

(22) Filed: Jul. 29, 2008

(65) Prior Publication Data

US 2009/0034139 A1 Feb. 5, 2009

Related U.S. Application Data

(60) Provisional application No. 60/935,287, filed on Aug. 3, 2007.

(51) Int. Cl.
*H02H 3/20* (2006.01)
*H02H 9/04* (2006.01)
(52) U.S. Cl. ........... 361/56; 361/58; 361/91.1; 361/91.2
(58) Field of Classification Search .................. 361/111, 361/56, 58, 91.1, 91.2
See application file for complete search history.

(56) References Cited

U.S. PATENT DOCUMENTS

| | | | | |
|---|---|---|---|---|
| 4,862,309 A | * | 8/1989 | Tojo et al. | 361/56 |
| 4,980,576 A | * | 12/1990 | Rossi et al. | 327/109 |
| 5,610,790 A | * | 3/1997 | Staab et al. | 361/56 |
| 5,808,503 A | * | 9/1998 | Miyazaki | 327/375 |
| 6,016,074 A | * | 1/2000 | Yamamori | 327/541 |
| 6,411,531 B1 | * | 6/2002 | Nork et al. | 363/60 |
| 7,212,036 B2 | * | 5/2007 | Kasuya et al. | 326/83 |
| 7,274,543 B2 | * | 9/2007 | Nishikawa et al. | 361/56 |
| 7,646,186 B2 | * | 1/2010 | Jung et al. | 323/284 |

OTHER PUBLICATIONS

MAXIM Corp., Overvoltage Protection in Automotive Systems, MAXIM Corp., Application Note 670, Apr. 2, 2002, pp. 1-6.*
LT4356-1, Overvoltage Protection Regulator and Inrush Limiter, Jul. 20, 2007, Linear Technology Corp.*
E. Jones, Perihelion Power Protector Proposal, Jul. 20, 2007, web publication in Matronics Email Lists.*
LTC4067, USB Power Manager with OVP and Li-Ion/Polymer Charger, Linear Technology, pp. 1-20, 2007.
LTC4356-1, Overvoltage Protection Regulator and Inrush Limiter, Linear Technology, pp. 1-20, 2007.
MAX4838-MAX4842, Overvoltage Protection Controllers with Status FLAG, Maxim, pp. 1-10, 2004.
TPS2400, Overvoltage Protection Controller, Texas Instruments, pp. 1-15, 2004.

* cited by examiner

*Primary Examiner* — Rexford Barnie
*Assistant Examiner* — Zeev V Kitov
(74) *Attorney, Agent, or Firm* — McDermott Will & Emery LLP

(57) ABSTRACT

An over-voltage protection circuit for use in low power integrated circuits is provided. The over-voltage protection circuit distributes certain connection and conditioning circuitry to a component network external to the integrated circuit. As a result, the integrated circuit need not be created with specialized high voltage components, significantly reducing its cost and complexity, and allowing it to be used in a wider range of end-user applications.

19 Claims, 2 Drawing Sheets

OVER-VOLTAGE PROTECTION CIRCUIT

PRIORITY CLAIM

This application claims priority from U.S. provisional application Ser. No. 60/935,287 filed Aug. 3, 2007.

FIELD OF INVENTION

This present invention generally relates to voltage protection circuitry, and more particularly, to circuits and methods for protecting electronic circuitry from over-voltage conditions that may damage or undesirably stress sensitive circuit components.

BACKGROUND

The purpose of an over-voltage protection circuit is to protect sensitive electronic circuitry from damage or stress that may result from the application of a voltage that exceeds a preset tolerance range. Such over-voltage protection circuits, sometimes referred to as "surge protectors," are common in the realm of consumer electronics. Frequently, electronic devices, such as televisions, stereos, or PCs are plugged into such surge protection circuits which are connected directly to a wall socket. During operation, if the wall socket voltage rises above a preset value (e.g., 125 volts) due to an electrical spike, the surge protector will clamp or otherwise short the excess voltage to ground, preventing the line voltage from rising above the preset value, and thereby protecting the connected devices from damage.

Integrated circuits are similarly prone to damage from over-voltage conditions, but tend to be far more sensitive to voltage spikes. This is largely due to the fragile nature of the integrated circuit components themselves, which are constructed from very thin layers of semiconductor material which are easily damaged by voltage levels that exceed a relatively narrow tolerance range. Further exacerbating this problem is the trend toward lower power, higher density semiconductors, which require smaller, and thus increasing fragile, discrete components.

In the past, several approaches have been attempted to address this problem. One approach has involved the use special high voltage fabrication techniques for portions of the input circuitry that are exposed directly to external voltage supplies. These components, such as pass transistors and diodes, are specially fabricated to tolerate high voltages and serve to isolate other sensitive circuitry form direct exposure to external voltage sources, and thereby prevent damage.

This approach, however, is not optimal, because the fabrication of high voltage input components, such as high voltage ESD cells, is costly due to the necessary process variations required to create these circuits and further because such high voltage components tend to consume large areas of valuable die space. In addition, this approach may result in the semiconductor manufacturer having to produce multiple versions of the same device, i.e., one which can tolerate high input voltages and one which operates within normal input voltage parameters, increasing overall production cost and complexity.

Accordingly, it would be desirable to provide circuits and methods for over-voltage protection that do not require special high voltage components disposed on the integrated circuit.

SUMMARY

An over-voltage protection circuit for use in low power integrated circuits is provided. The over-voltage protection circuit distributes certain connection and conditioning circuitry to a component network external to the integrated circuit. As a result, the integrated circuit need not be created with specialized high voltage components, significantly reducing its cost and complexity, and allowing it to be used in a wider range of end-user applications.

In one embodiment of the present invention, an integrated circuit having low voltage components and configured to interoperate with external circuitry and to provide over-voltage protection is provided, the integrated circuit comprising: a sensing circuit configured to receive an external sensing signal indicative of an input voltage and to determine whether the input voltage is greater than a preset threshold; and a driver circuit coupled to the sensing circuit and configured to generate a drive signal based on an output of the sensing circuit, the drive signal being suitable for commanding an external switching element between ON and OFF states, such that the input voltage is disconnected from a power input of the integrated circuit when the output of the sensing circuit indicates the input voltage is greater than the preset threshold.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
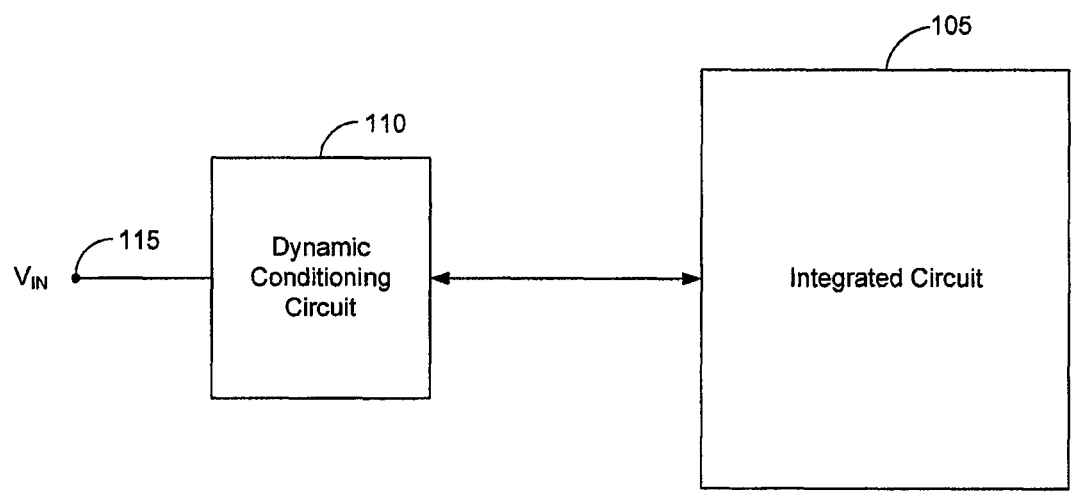
FIG. 1 is a block diagram of an over-voltage protection circuit constructed in accordance with the principles of the invention.

A general block diagram of an over-voltage protection circuit 100, constructed in accordance with the principles of the present invention, is shown in FIG. 1. As shown, circuit 100 may include an external dynamic conditioning circuit 110 having an input node 115, and an integrated circuit 105. Integrated circuit 105 may be any suitable analog, digital or mixed signal integrated circuit as further described herein. Moreover, integrated circuit 105 may be a "low power" integrated circuit, and need not include specialized high voltage input components, but rather may employ standard electrostatic discharge protection (ESD) cells as are commonly known in the art (not shown).

During operation, an input voltage may be applied to input node 115. Dynamic conditioning circuit 110 allows the input voltage $V_{IN}$ to selectively pass through to integrated circuit 105 based on commands provided by circuit 105. For example, in the case where the input voltage $V_{IN}$ exceeds a preset threshold as determined by circuit 105, it directs dynamic conditioning circuit 110 to create an open circuit (e.g., high impedance transmission path) and disconnects $V_{IN}$ from a power pin of circuit 105. Alternatively, in the case where the input voltage $V_{IN}$ is within the preset threshold range, circuit 105 directs dynamic conditioning circuit 110 to create a closed circuit (e.g. a low impedance transmission path) to connect the input voltage to the power input of circuit 105. Generally speaking, this configuration allows power to be selectively applied to integrated circuit 105 when it is below or equal to the desired preset threshold, but excludes voltages that are above the threshold, thus minimizing or preventing damage to sensitive circuit components during the occurrence of an over-voltage condition.

More specifically, dynamic conditioning circuit 110 may further generate a sensing signal, which is based on the input voltage and provided to integrated circuit 105. The sensing signal may be coupled to integrated circuit 105 at substantially all times, irrespective of the value of $V_{IN}$, to monitor its value. The sensing signal is used by integrated circuit 105 to determine whether the input voltage is within acceptable limits and thus may be applied to its power input. Circuit 110 may generate the sensing signal by passing $V_{IN}$ through an impedance to establish a desired current range. Furthermore, in the case of an over-voltage condition, a voltage clamp in integrated circuit 105 may regulate the sensing signal to a preset voltage level to prevent excessive voltage from being applied to the sensing circuitry (not shown in FIG. 1).

Thus, in operation, integrated circuit 105 may determine whether the input voltage is within acceptable limits by comparing the sensing signal to a preset threshold. This may be accomplished, for example, by coupling a comparison circuit to the sensing signal and to a voltage reference that establishes the threshold level (not shown in FIG. 1). If the sensing signal is above the threshold level, the comparison circuit commands dynamic conditioning circuit 110 to a high impedance state (an "OFF" state) whereas if the sensing signal is below the threshold, circuit 110 is commanded to a low impedance state (an "ON" state).

Accordingly, by employing the configuration described above, it is possible to protect integrated circuit 105 from over-voltage conditions through the use of an external dynamic conditioning circuit 110. Protection is achieved in at least two ways. First, circuit 100 selectively connects the input voltage $V_{IN}$ to integrated circuit 105 when it is within acceptable limits. This prevents damage to circuit 105 based on an over-voltage condition at its power rail. Second, the sensing signal is generated by passing the input voltage through conditioning impedance to maintain its current value within a desired range. By distributing the connection and conditioning circuitry to an external circuit 110, integrated circuit 105 need not include any specialized high voltage components, which significantly reduces the cost and complexity of circuit 105 and allows it to be used in a wider range of end-user applications.

Figure 2:
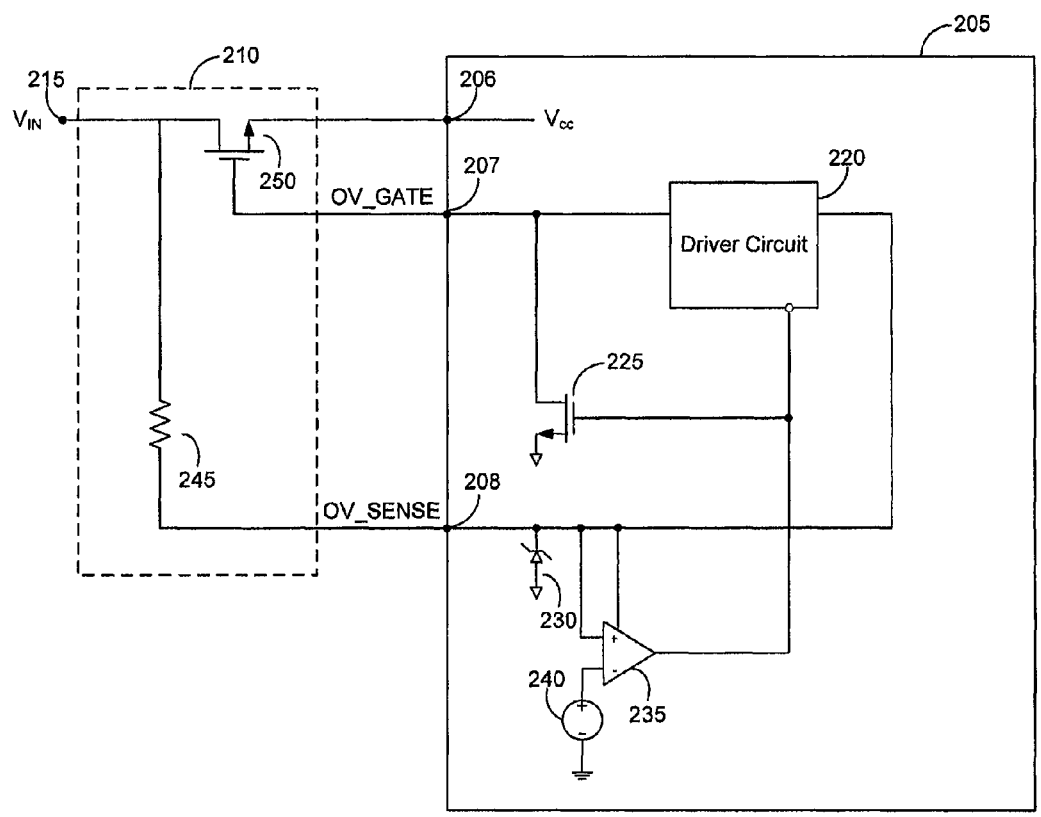
FIG. 2 is a schematic diagram illustrating one specific embodiment of the over-voltage protection circuit shown in FIG. 1.

One possible specific implementation of circuit 100 is shown in FIG. 2 as over-voltage protection circuit 200. Circuit 200 is similar in many ways to circuit 100 and includes components and functional blocks that have been numbered similarly to denote similar functionality and general correspondence. For example, circuit 200 includes integrated circuit 205 (integrated circuit 105 in FIG. 1), dynamic conditioning circuit 210 (dynamic conditioning circuit 110 in FIG. 1) etc.

As shown in FIG. 2, circuit 200 generally includes a dynamic conditioning circuit 210 and an integrated circuit 205. Circuit 210 may include a switching element 250, such as an NMOS transistor, and an impedance 245, such as a resistor. In some embodiments, these components may be discrete components which may be added by the end-user to obtain specific performance objectives (i.e., over-voltage protection). For example, a manufacturer of integrated circuit 105 may explain in application notes how to select switching element 250 and/or impedance 245 to obtain desired performance goals. In other embodiments, however, these components may be in a prefabricated circuit network offered by the manufacturer of integrated circuit 105 or a third party vendor which are designed to provide a pre-specified protection level.

As shown in FIG. 2, integrated circuit 205 may include a switching element 225, such as an NMOS transistor, a driver circuit 220 such as a voltage multiplier or charge pump, a voltage clamp circuit 230, which may be either an active clamp such a bandgap-based shunt regulator or a passive clamp such as a Zener diode, a voltage reference circuit 240, such as a fixed voltage source, bandgap voltage reference or Zener diode, and a comparator circuit 235.

Similar to the circuit 100 shown in FIG. 1, circuit 200 provides over-voltage protection by selectively connecting the input voltage at node 215 to the power pin (node 206) of integrated circuit 205. Further protection is provided by impedance 245 which generates an over-voltage sensing signal (OV_SENSE) from $V_{IN}$ such that it is within a desired current range. This current range may be may selected in view of the current sinking capacity of clamp 230.

The over-voltage protection circuit of FIG. 2 may operate as follows. Assume that an input voltage $V_{IN}$ is applied to input node 215. This causes dynamic conditioning circuit 210 to generate the OV_SENSE signal by passing $V_{IN}$ through impedance 245. This signal is applied to a sensing node of integrated circuit 205 (node 208). As shown, within integrated circuit 205, the OV_SENSE signal is coupled to the non-inverting terminal of comparator 235 and is compared to the voltage at its inverting terminal (which is provided by voltage reference 240). The reference voltage at the inverting terminal of comparator 235 is selected to represent the maximum allowable value for $V_{IN}$ (i.e., input voltages above this value indicate an over-voltage condition).

In some embodiments of the invention, voltage reference 240 may be a fixed value set by the manufacturer during fabrication (e.g., a bandgap voltage reference). However, in other embodiments, reference 240 may be selectable or programmable by the end user. For example, integrated circuit 105 may include a programmable memory which interacts with reference 240 to set its voltage as specified by the user using conventional techniques (not shown). Further, the value of reference 240 may be established through the use of an external component network such a voltage divider or other circuitry as is known in the art (not shown).

Accordingly, if comparator 235 determines that an over-voltage condition is present at $V_{IN}$ (i.e., $V_{IN}$ is greater than the voltage provided by reference 240) it trips and produces a logic high at its output. This logic high signal is coupled to the gate of NMOS 225 and an inverting input of voltage multiplier 220. The logic high signal causes NMOS 225 to be turned ON, which pulls the gate of NMOS 250 to ground, turning it OFF, and disconnecting $V_{IN}$ from the power pin of circuit 205 (node 206).

In addition, the logic high signal from comparator 235 disables driver circuit 220, whose output is also pulled to ground through NMOS 225. As long as the OV_SENSE voltage remains greater than the voltage generated by reference 240, NMOS 250 remains OFF, and $V_{IN}$ remains disconnected from a power input of circuit 205, thus protecting circuit 205 from the over-voltage condition sensed at $V_{IN}$. During an over-voltage condition, clamp 230 regulates OV_SENSE to a voltage somewhat above the threshold provided by reference 240 (e.g., 1 volt above) but within the tolerance level of the standard circuitry within circuit 205. This prevents the circuitry directly exposed to OV_SENSE from being unduly stressed or damaged.

When $V_{IN}$ drops below the threshold value set by reference 240, circuit 200 re-enters the normal operating range, which causes comparator 235 to toggle, producing a logic low at its output. The logic low signal causes NMOS 225 to turn OFF, which disconnects the gate of NMOS 250 from ground. Furthermore, the logic low signal enables driver circuit 220. As a result of being enabled, the driver circuit, such as an inductive boosting circuit or voltage multiplier, generates a boosted sensing signal at its output (OV_GATE), which is applied to the gate of NMOS 250, turning it ON (through pin 207). This allows input voltage $V_{IN}$ to be applied to power input pin 206. Because clamp 230 regulates OV_SENSE at a voltage somewhat above the threshold provided by reference 240, it sinks virtually no current during normal operation.

It will be understood from the foregoing, that the reference voltage provided by circuit 240 should be less than the cutoff voltage of clamp 230 to ensure proper operation. In some embodiments of the invention, these two functions may be merged using known techniques to ensure this condition is met.

Moreover, in some embodiments of the invention, driver 220 and comparator 235 may be designed such that the sum of their quiescent current multiplied by the resistance of impedance 245 is a small fraction of the cutoff voltage of reference 240. This allows $V_{IN}$ to be sensed accurately due the relatively small difference between $V_{IN}$ and OV_SENSE and furthermore in view of the ability to introduce an appropriate correction factor for the voltage drop with reference 240.

For example, in the case where the resistance of impedance 245 is 6.04 KΩ and the combined quiescent current of multiplier 220 and comparator 235 is 33 µA, the resulting voltage drop across impedance 245 equals about 200 mV. Accordingly, the voltage supplied by reference 240 may be programmed to be 200 mV less than actual desired threshold point to compensate for the voltage drop. For example, a desired threshold point of 5 volts can be obtained in circuit 205 by setting reference 240 to provide 4.8 volts, thereby substantially eliminating voltage drop error introduced by the quiescent current. Using this approach, any sensing error would be largely due to uncertainty in the quiescent current level, which at about +/−20% due to process variation, may result in an overall sensing error of less than about 1%.

Moreover, generally speaking, it is desirable for the load on pin 208 (the OV_SENSE node) to be fairly constant and noise free to prevent inadvertent triggering of comparator 235. Accordingly, in embodiments where voltage driver circuit 220 is a charge pump circuit, low noise charge pump topologies may used such as those described in U.S. Pat. No. 6,411,531, which is hereby incorporated by reference in its entirety.

Additionally, in certain embodiments of the invention, it may be desirable to regulate the output of driver circuit 220 to prevent it from reaching unnecessarily high levels immediately prior to the occurrence of an over-voltage event (and thereby prevent stress or damage to NMOS 250). Such regulation circuitry may be internal or external to voltage multiplier 220 and/or circuit 205 and may include any suitable regulation circuitry known in the art (e.g., shunt regulator, Zener diode, etc.).

Moreover, in some embodiments of the invention, the input pins of integrated circuit 205 may further be coupled to a voltage clamp circuit to provide ESD protection as is known in the art, using standard ESD cells (not shown). Such clamp circuitry typically regulates at a voltage higher than the cutoff of 230 (e.g., at about 12 volts) and is also produced using a low voltage process. In these embodiments, an additional voltage divider may be coupled between clamp 230 and the ESD clamp to prevent it from regulating to the lower voltage. In other embodiments, however, only clamp 230 (or the ESD clamp) may be present at the input pins of circuit 205, and is responsible for providing both functions (i.e., ESD protection, and external source regulation).

It will be appreciated that the degree of over-voltage protection provided by the present invention is based, at least in part, on the tolerance level of certain components such as the breakdown voltage associated with switching element 250 and the current sinking capability of voltage clamp 230. For example, commonly available NMOS transistors, suitable for use as switching element 250, may withstand about a 30 volt drain to source differential. However, other switching elements, having higher standoff voltages, may be used if desired.

Furthermore, in the case where circuit 205 is fabricated with standard ESD cells, voltage clamp 230 may be configured to sink about 15 mA. With the 6.04 KΩ resistor described above, and a shunt regulation level of 6 volts, input voltages of approximately 100 volts are sustainable without sacrificing regulation. Nevertheless, it will be appreciated that further increases in the breakdown voltage of switching element 250 and the current sinking capability of clamp 230 will improve the over-voltage protection provided by the present invention.

Thus, it can be seen from the above that over-voltage protection may be provided in accordance with the principles of the present invention by distributing the connection and conditioning circuitry to an external circuit 210. Certain other sensing and voltage boosting circuitry may reside on integrated circuit 205, and need not be created through specialized high voltage fabrication techniques, significantly reducing the cost and complexity of circuit 205 and, allowing it to be used in a wider range of end-user applications.

Although preferred embodiments of the present invention have been disclosed with various circuits connected to other circuits, persons skilled in the art will appreciate that it may not be necessary for such connections to be direct and additional circuits may be interconnected between the shown connected circuits without departing from the spirit of the invention as shown. Persons skilled in the art also will appreciate that the present invention can be practiced by other than the specifically described embodiments. The described embodiments are presented for purposes of illustration and not of limitation, and the present invention is limited only by the claims which follow.

What is claimed is:

1. An integrated circuit having low voltage components configured to interoperate with external circuitry and to provide over-voltage protection, the integrated circuit comprising:

a sensing circuit configured to receive an external sensing signal indicative of an input voltage and to determine whether the input voltage is greater than a preset threshold, wherein the sensing signal is generated by passing the input voltage through an impedance external with respect to the integrated circuit;

a driver circuit coupled to the sensing circuit and configured to generate a drive signal based on an output of the sensing circuit, the drive signal being suitable for commanding an external switching element between ON and OFF states, such that the input voltage is disconnected from a power input of the integrated circuit when the output of the sensing circuit indicates the input voltage is greater than the preset threshold; and a first voltage regulator circuit coupled to the external impedance to maintain a voltage of the sensing signal below a predetermined value, the first voltage regulator circuit being coupled to the external impedance so as to reduce impedance of circuitry for passing the input voltage through the external impedance when the voltage of the sensing signal reaches the predetermined value.

2. The integrated circuit of claim 1 wherein the input voltage is connected to the power input of the integrated circuit when the output of the sensing circuit indicates the input voltage is less than the preset threshold.

3. The integrated circuit of claim 1 wherein the first voltage regulator circuit comprises an active voltage regulator circuit.

4. The integrated circuit of claim 1 wherein the first voltage regulator circuit comprises a passive voltage regulator circuit.

5. The integrated circuit of claim 4 wherein the sensing circuit comprises a comparator circuit.

6. The integrated circuit of claim 5 further comprising a voltage reference circuit coupled to the comparator circuit, wherein the voltage reference circuit generates a reference voltage and establishes the preset threshold.

7. The integrated circuit of claim 6 wherein the voltage reference circuit is programmable by an end-user.

8. The integrated circuit of claim 5 wherein the comparator circuit is configured to compare the sensing signal with the preset threshold established by the voltage reference circuit to determine whether the input voltage is greater than a preset threshold.

9. The integrated circuit of claim 6 wherein a cutoff voltage of the first voltage regulator is greater than the reference voltage.

10. The integrated circuit of claim 1 further comprising a second voltage regulator circuit responsive to the drive signal which maintains a voltage of the drive signal below a predetermined value.

11. The integrated circuit of claim 10 wherein the second voltage regulator circuit comprises an active voltage regulator circuit.

12. The integrated circuit of claim 11 wherein the second voltage regulator circuit comprises a passive voltage regulator circuit.

13. The integrated circuit of claim 1 wherein the driver circuit comprises a voltage booster circuit, and wherein the voltage booster circuit generates the drive signal by boosting the sensing signal.

14. The integrated circuit of claim 13 wherein the voltage booster circuit comprises an inductive booster circuit.

15. The integrated circuit of claim 13 wherein the voltage booster circuit comprises a voltage multiplier circuit.

16. The integrated circuit of claim 13 wherein the voltage booster circuit comprises a charge pump circuit.

17. The integrated circuit of claim 16 wherein the charge pump circuit is a low-noise charge pump circuit.

18. The integrated circuit of claim 1 wherein the drive circuit is disabled when the output of the sensing circuit indicates the input voltage is greater than the preset threshold.

19. The integrated circuit of claim 1 wherein the drive circuit is enabled when the output of the sensing circuit indicates the input voltage is less than the preset threshold.

* * * * *